US011760343B2

(12) United States Patent
Miyamoto et al.

(10) Patent No.: US 11,760,343 B2
(45) Date of Patent: Sep. 19, 2023

(54) VEHICLE CONTROL APPARATUS

(71) Applicants: TOYOTA JIDOSHA KABUSHIKI KAISHA, Toyota (JP); DENSO CORPORATION, Kariya (JP)

(72) Inventors: Yuhei Miyamoto, Toyota (JP); Kohei Morotomi, Nagoya (JP); Tooru Takahashi, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 446 days.

(21) Appl. No.: 17/169,830

(22) Filed: Feb. 8, 2021

(65) Prior Publication Data
US 2021/0253092 A1    Aug. 19, 2021

(30) Foreign Application Priority Data
Feb. 14, 2020   (JP) ................. 2020-023707

(51) Int. Cl.
*B60W 30/09* (2012.01)
*B60W 30/095* (2012.01)
(Continued)

(52) U.S. Cl.
CPC ............ *B60W 30/09* (2013.01); *B60W 10/18* (2013.01); *B60W 10/20* (2013.01);
(Continued)

(58) Field of Classification Search
CPC ...... B60W 30/09; B60W 10/18; B60W 10/20; B60W 30/0956; B60W 2520/06;
(Continued)

(56) References Cited

U.S. PATENT DOCUMENTS

| 2017/0057498 | A1  | 3/2017  | Katoh |
| 2020/0180611 | A1* | 6/2020  | Klingemann ......... B60W 50/14 |
| 2020/0391733 | A1* | 12/2020 | Kumagai ................. B60T 7/22 |

FOREIGN PATENT DOCUMENTS

| JP | 2017-043262 A  |   | 3/2017 |              |
| JP | 2017-056795 A  |   | 3/2017 |              |
| JP | 2017056795  A  | * | 3/2017 | ...... B60T 7/12 |

OTHER PUBLICATIONS

Sen, Xiao, Jikuang Yang, and Zhihua Zhong. "Research and optimization of crashworthiness in small overlap head-on collision." 2013 Fifth International Conference on Measuring Technology and Mechatronics Automation. IEEE, 2013. (Year: 2013).*

* cited by examiner

*Primary Examiner* — Russell Frejd
*Assistant Examiner* — Ana D Thomas
(74) *Attorney, Agent, or Firm* — Sughrue Mion, PLLC

(57) ABSTRACT

A vehicle control apparatus performs automatic braking control when an execution condition is satisfied, in a case where a lap rate of the obstacle is a threshold lap rate or more. Furthermore, the vehicle control apparatus performs automatic steering control when the execution condition is satisfied, in a case where the lap rate is less than the threshold lap rate and furthermore an avoidance area in which the vehicle can avoid a collision with the obstacle without traveling out of a self-lane and passage of the vehicle is not blocked by a passage inhibition object. The vehicle control apparatus performs the automatic braking control when a special condition including a condition that the execution condition is satisfied at least is satisfied, if the passage inhibition object exists, in a case where the lap rate is less than the threshold lap rate and furthermore the avoidance area does not exist.

3 Claims, 9 Drawing Sheets

(51) Int. Cl.
*B60W 10/20* (2006.01)
*B60W 10/18* (2012.01)

(52) U.S. Cl.
CPC ..... *B60W 30/0956* (2013.01); *B60W 2520/06* (2013.01); *B60W 2554/4041* (2020.02)

(58) Field of Classification Search
CPC ... B60W 2554/4041; B60W 2554/801; B60W 2552/50
See application file for complete search history.

VEHICLE CONTROL APPARATUS

TECHNICAL FIELD

The present disclosure relates to a vehicle control apparatus which performs automatic braking control in which braking force is given to wheels when a lap rate of an obstacle that is an object located in a traveling area of a vehicle with the vehicle is more than a threshold lap rate, and performs automatic steering control in which a steering angle is controlled so as to avoid a collision with the obstacle when the lap rate is less than the threshold lap rate.

BACKGROUND ART

Conventionally, a vehicle control apparatus which performs automatic braking control in which braking force is given to wheels in order to avoid collision with an obstacle or in order to reduce collision damage upon collision with an obstacle has been known. The obstacle is an object which is located in a traveling area of a vehicle and has the shortest time to collision (which will be referred to as "TTC" hereafter, and the TTC is an abbreviation for Time To Collision) that is time predicted to be taken before collision with the vehicle or the closest approach to the vehicle.

For example, a vehicle control apparatus described in the Patent Document 1 (PTL1) (which will be referred to as a "first conventional apparatus" hereafter) performs automatic braking control when a lap rate which shows a lap degree in a vehicle width direction of a vehicle and an obstacle is a predetermined threshold lap rate or more. On the other hand, there is a high possibility that a collision with the obstacle may be avoided by a driver operating a steering wheel when the lap rate is less than the threshold lap rate. When the automatic braking control is performed in such a case, there is a high possibility that sense of incongruity may be given to the driver. For this reason, the first conventional apparatus does not perform the automatic braking control when the lap rate is less than the threshold lap rate.

Furthermore, a vehicle control apparatus described in the Patent Document 2 (PTL2) (which will be referred to as a "second conventional apparatus" hereafter) performs automatic steering control in which a steering angle is controlled such that a vehicle travels on an avoidance area on a side of an obstacle in order to avoid a collision with the obstacle without traveling out of its self-lane

CITATION LIST

Patent Literature

[PTL1] Japanese Patent Application Laid-Open (kokai) No. 2017-56795
[PTL2] Japanese Patent Application Laid-Open (kokai) No. 2017-43262

SUMMARY

In the second conventional apparatus, it is not examined how the vehicle should be controlled in a case where a passage inhibition object that is the object other than the obstacle exists in an area through which the vehicle passes when the automatic steering control is performed (avoidance area) and thereby passage of the vehicle is blocked. As a matter of course, also in the first conventional apparatus, control of the vehicle under the above-mentioned situation is not examined.

The present disclosure has been conceived in order to cope with the above-mentioned subject. Namely, one of objectives of the present disclosure is to provide a vehicle control apparatus which appropriately controls a vehicle when a passage inhibition object exists in a case where automatic steering control is about to be performed.

A vehicle control apparatus according to the present disclosure (which may be referred to as a "present-disclosure apparatus" hereafter) comprises:
  an information-acquisition device (24, 26) which acquires peripheral information including information about objects located around a vehicle and a self-lane on which the above-mentioned vehicle is traveling currently,
  a braking actuator (54) configured so as to be able to give braking force to the above-mentioned vehicle,
  a steering actuator (66) configured so as to be able to change a steering angle of the above-mentioned vehicle, and
  a control unit (20, 40, 50, 60) which controls the above-mentioned braking actuator and the above-mentioned steering actuator.
The above-mentioned control unit is configured so as to,
  acquire a collision index value indicating a possibility that the above-mentioned vehicle and the objects located in a traveling area of the above-mentioned vehicle may collide with each other based on the above-mentioned peripheral information (step 415), and to acquire a lap rate indicating a lap degree in a vehicle width direction between the above-mentioned vehicle and an obstacle that is the object having the smallest collision index value based on the above-mentioned peripheral information (step 420 and step 425),
  perform automatic braking control in which the above-mentioned braking actuator is driven to give the above-mentioned braking force to the above-mentioned vehicle (step 445 "Yes") when an execution condition which is satisfied when the collision index value for the above-mentioned obstacle and a collision-avoidance threshold value fulfill a predetermined condition is satisfied (step 440 "Yes"), in a case where the above-mentioned lap rate is a predetermined threshold lap rate or more (step 430 "Yes"),
  perform automatic steering control in which the above-mentioned steering angle is changed by the above-mentioned steering actuator such that the above-mentioned vehicle travels toward the above-mentioned avoidance area (step 470) when the above-mentioned execution condition is satisfied (step 465 "Yes"), in a case where the above-mentioned lap rate is less than the above-mentioned predetermined threshold lap rate (step 430 "No") and furthermore an avoidance area in which the above-mentioned vehicle can avoid a collision with the above-mentioned obstacle without traveling out of the above-mentioned self-lane and passage of the above-mentioned vehicle is not blocked by a passage inhibition object that is the object other than the above-mentioned obstacle exists (step 455 "Yes"), and
  perform the above-mentioned automatic braking control (step 720) when a special condition including a condition that the above-mentioned execution condition is satisfied at least is satisfied (step 485, step 705 "Yes"), if the above-mentioned passage inhibition object exists (step 475 "Yes"), in a case where the above-mentioned lap rate is less than the above-mentioned threshold lap rate (step 430 "No") and furthermore the above-mentioned avoidance area does not exist (step 455 "No").

The present-disclosure apparatus performs the automatic steering control, when an avoidance space exists and the execution condition is satisfied, in a case where the lap rate is the threshold lap rate or less. Since there is a possibility that the vehicle may collide with the passage inhibition object if the automatic steering control is performed, when the avoidance space does not exist due to the existence of the passage inhibition object, in a case where the lap rate is the threshold lap rate or less, the automatic steering control is not performed. Under such a situation, it is thought that a possibility that a driver may perform a steering operation in order to avoid the collision with the obstacle is comparatively low, even if the lap rate is less than the threshold lap rate. For this reason, the present-disclosure apparatus performs the automatic braking control, if a special condition is satisfied, in a case where the lap rate is less than the threshold lap rate and the avoidance space does not exist due to the existence of the passage inhibition object Thereby, the present-disclosure apparatus can appropriately perform control for avoiding the collision with the obstacle, while reducing a possibility that sense of incongruity may be given to the driver by the automatic braking control being performed when the driver is about to carry out the above-mentioned steering operation, as much as possible.

In some embodiments,
the above-mentioned control unit is configured so as to,
acquire a virtual lap rate indicating a lap degree in a vehicle width direction of the above-mentioned vehicle between the above-mentioned vehicle and a virtual obstacle obtained by assuming the above-mentioned obstacle and the above-mentioned passage inhibition object as one virtual object (step 480), if the above-mentioned passage inhibition object exists (step 475 "Yes"), in a case where the above-mentioned lap rate is less than the above-mentioned threshold lap rate (step 430 "No") and furthermore the above-mentioned avoidance area does not exist (step 455 "No"), and
judge that the above-mentioned special condition is satisfied, in a case where the above-mentioned virtual lap rate is the above-mentioned threshold lap rate or more (step 705 "Yes") and the above-mentioned execution condition is satisfied (step 715 "Yes").

In accordance with the above-mentioned aspect, the lap degree between the virtual obstacle and the vehicle is acquired as the virtual lap rate. Since a possibility that the driver may perform the above-mentioned steering operation is low when the virtual lap rate is the threshold lap rate or more, the automatic braking control is performed. In accordance with the above-mentioned aspect, since it is determined whether to perform the automatic braking control depending on the virtual lap rate, the possibility that sense of incongruity may be given to the driver by the automatic braking control being performed when the driver is about to carry out the steering operation can be further reduced.

In some embodiments,
the above-mentioned control unit is configured so as to,
set the above-mentioned collision-avoidance threshold value as such a value that the smaller the above-mentioned lap rate becomes, the more difficult it becomes for the above-mentioned execution condition to be satisfied (step 435, step 460, FIG. 5), in the judgment whether the above-mentioned execution condition is satisfied or not (step 440, step 465) in any of a case where the above-mentioned lap rate is the above-mentioned threshold lap rate or more (step 430 "Yes") and a case where the above-mentioned lap rate is less than the above-mentioned threshold lap rate (step 430 "No") and furthermore the above-mentioned avoidance area exists (step 455 "Yes"), and
set the above-mentioned collision-avoidance threshold value as such a value that the smaller the above-mentioned virtual lap rate becomes, the more difficult it becomes for the above-mentioned execution condition to be satisfied (step 710), in the judgment whether the above-mentioned execution condition is satisfied or not (step 715) in a case where the above-mentioned lap rate is less than the above-mentioned threshold lap rate (step 430 "No") and furthermore the above-mentioned avoidance area does not exist (step 455 "No") and the above-mentioned passage inhibition object exists (step 475 "Yes").

Thereby, it results in that the execution condition will be satisfied at a suitable timing corresponding to the lap rate, and the automatic braking control and the automatic steering control can be performed at a suitable timing. Furthermore, it results in that the execution condition will be satisfied at a suitable timing corresponding to the virtual lap rate, and the automatic braking control can be performed at a suitable timing.

In addition, in the above-mentioned explanation, in order to help understanding of the present disclosure, for constituents of embodiments which will be mentioned later, names and/or reference signs used in the embodiments are attached in parenthesis. However, each of the constituents of the present disclosure is not limited to the embodiments specified with the above-mentioned names and/or reference signs. Other objective, other features and accompanying advantages of the present disclosure will be easily understood from the following explanation about the embodiments of the present disclosure described referring to drawings.

DESCRIPTION OF EMBODIMENTS

Figure 1:
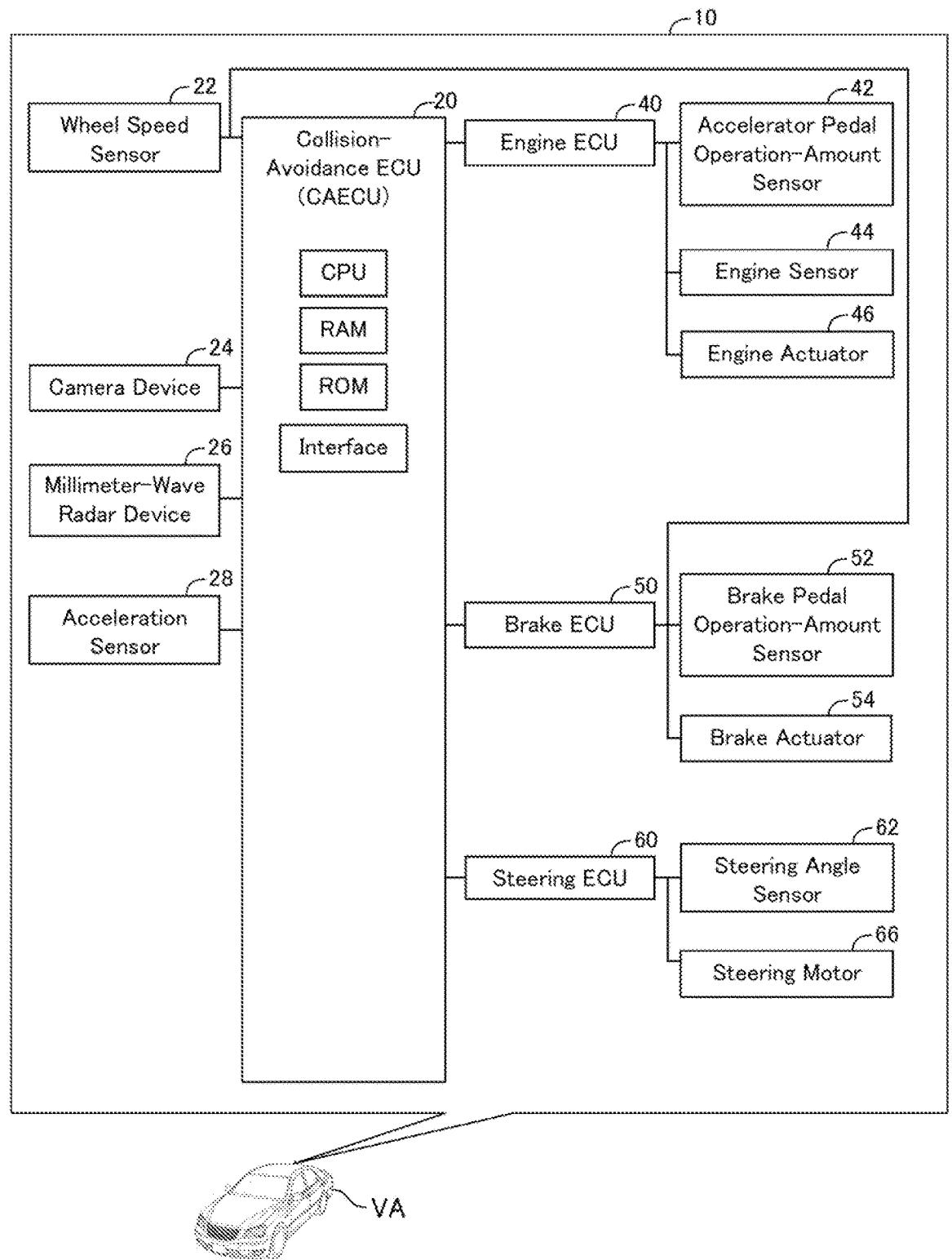
FIG. 1 is a schematic system configuration diagram of a vehicle control apparatus according to an embodiment of the present disclosure (present control apparatus).

Hereafter, a vehicle control apparatus according to an embodiment of the present disclosure (which will be referred to as a "present control apparatus" hereafter) 10 will be explained referring to FIG. 1 to FIG. 7. In FIG. 1, the present control apparatus 10 and a vehicle VA to which the control apparatus 10 is applied are shown.

As shown in FIG. 1, the present control apparatus 10 comprises a collision-avoidance ECU (which will be referred to as a "CAECU" hereafter) 20, an engine ECU 40, a brake ECU 50 and a steering ECU 60. These ECUs are connected to each other so as to able to exchange data (allow communication) through a CAN (Controller Area Network).

The ECU is an abbreviation for an electronic control unit, and is an electronic control circuitry which has as a main component a microcomputer including a CPU, ROM, RAM and an interface, etc. The ECU may be referred to as a "control unit" or a "controller". The CPU realizes various functions by executing instructions (routines) stored in the memory (ROM). All or some of the above-mentioned ECUs 20, 40, 50 and 60 may be integrated in one ECU.

Furthermore, the present control apparatus 10 comprises a plurality of wheel speed sensors 22, a camera device 24, a millimeter-wave radar device 26 and an acceleration sensor 28. These are connected to the CAECU 20.

The wheel speed sensor 22 is prepared for each of wheels of the vehicle VA. Each wheel speed sensor 22 generates one wheel pulse signal every time a corresponding wheel rotates a predetermined angle. The CAECU 20 counts the number of pulses per unit time of the wheel pulse signals transmitted from each wheel speed sensor 22, and acquires rotational speed (wheel speed) of each wheel based on the number of pulses. The CAECU 20 acquires vehicle speed Vs which shows speed of the vehicle VA based on the wheel speed of each wheel. As an example, the CAECU 20 acquires an average value of the wheel speed of four wheels as the vehicle speed Vs.

The camera device 24 is disposed in an upper part of a front window in a vehicle interior of the vehicle VA. The camera device 24 acquires image data of an image (camera image) of a front area of the vehicle VA, and acquires object information (camera object information) and white line information, etc. from the image.

The camera object information includes a distance to an object (a vehicle and a pedestrian, etc.) located in the front area, a direction to the object and a width of the object, etc. The white line information includes positions of a right white line RWL and a left white line LWL which divide a self-lane SL that is a lane in which the vehicle VA is running currently (refer to FIG. 2B and FIG. 3) with respective to the vehicle VA, etc.

The millimeter-wave radar device 26 is prepared near a center in a vehicle width direction of a front end of the vehicle VA (which will be referred to as a "front end central part" hereafter). The millimeter-wave radar device 26 transmits millimeter wave which propagates in a predetermined range in front of the vehicle VA. The millimeter wave is reflected by a three-dimensional object (object) such as another vehicle, a pedestrian and a two-wheeled vehicle. The millimeter-wave radar device 26 receives this reflected wave, and acquires radar object information based on the reflected wave. The radar object information includes a distance to the object, relative speed of the object with respective to the vehicle VA, and a direction of the object to the vehicle VA, etc.

The acceleration sensor 28 detects acceleration in a front-back direction, acceleration in a vehicle width direction (transverse direction) (which may be referred to as a "lateral acceleration" hereafter) and acceleration in a height orientation which act on the vehicle VA, and transmits a detection signal representing these acceleration to the CAECU 20.

The CAECU 20 recognizes an object based on the camera object information and the radar object information. In more detail, the CAECU 20 specifies a distance to the object (vertical position) and relative speed of the object based on the radar object information. Furthermore, the CAECU 20 specifies a width of the object in a vehicle width direction (breadth) and a place of an object (horizontal position) in a vehicle width direction based on the camera object information.

The engine ECU 40 is connected with an accelerator pedal operation-amount sensor 42 and an engine sensor 44, and receives detection signals from these sensors.

The accelerator pedal operation-amount sensor 42 detects an operation amount of an accelerator pedal (not illustrated) of the vehicle VA (namely, an accelerator pedal operation-amount AP). The accelerator pedal operation-amount AP is "0" when a driver is not operating an accelerator pedal.

The engine sensor 44 is a sensor which detects an operational state amount of a "gasoline fuel-injection type-spark ignition-internal combustion engine that is a driving source of the vehicle VA" which is not illustrated. The engine sensors 44 are a throttle valve opening sensor, an engine rotational-speed sensor and an intake air quantity sensor, etc.

Furthermore, the engine ECU 40 is connected with engine actuators 46, such as "a throttle valve actuator and a fuel injection valve." The engine ECU 40 drives the engine actuator 46 and thereby changes torque generated by the internal combustion engine to adjust driving force of the vehicle VA.

The engine ECU 40 determines a target throttle valve opening TAtgt such that the larger the accelerator operation-amount AP becomes, the larger the target throttle valve opening TAtgt becomes. The engine ECU 40 drives a throttle valve actuator such that an opening of a throttle valve coincides with the target throttle valve opening TAtgt.

The brake ECU 50 is connected with the wheel speed sensor 22 and a brake pedal operation-amount sensor 52, and receives detection signals from these sensors.

The brake pedal operation-amount sensor 52 detects an operation amount of a brake pedal (not illustrated) of the vehicle VA (namely, a brake pedal operation amount BP). The brake pedal operation amount BP is "0" when a brake pedal is not being operated.

The brake ECU 50 acquires rotational speed of each wheel and vehicle speed Vs based on the wheel pulse signals transmitted from the wheel speed sensors 22 similarly to the CAECU 20. The brake ECU 50 may acquire these from the CAECU 20.

Furthermore, the brake ECU 50 is connected with a brake actuator 54. The brake actuator 54 is a hydraulic control actuator. The brake actuator 54 is disposed in a hydraulic circuit between a master cylinder which pressurizes hydraulic fluid by a tread force on a brake pedal and a friction brake apparatus including a well-known wheel cylinder prepared in each wheel (none of them is illustrated). The brake actuator 54 adjusts hydraulic pressure supplied to the wheel cylinder, and adjusts braking force of the vehicle VA. In addition, the brake actuator 54 may be referred to as a "braking actuator."

The brake ECU 50 determines "target acceleration that is a negative value" based on the brake pedal operation amount BP. The brake ECU 50 drives the brake actuator 54 such that actual acceleration of the vehicle VA coincides with the target acceleration.

The steering ECU 60 is a control unit for a well-known electric power-steering system, and is connected to a steering angle sensor 62 and a steering motor 66. The steering motor 66 is built in a "steering mechanism (not illustrated) including a steering wheel (not illustrated), a steering shaft and a steering gear mechanism (not illustrated) connected to the steering wheel, etc." of the vehicle VA. The steering motor 66 may be referred to as a "steering actuator."

The steering angle sensor 62 detects a steering angle θ of the vehicle VA, and outputs a detection signal representing the steering angle θ to the steering ECU 60.

The steering motor 66 generates torque according to electric power whose direction and magnitude, etc. are controlled by the steering ECU 60 to add steering assist torque and/or steer a lateral pair of steered wheels with this torque. Namely, the steering angle can be controlled using the steering motor 66. The above-mentioned electric power is supplied from a battery (not illustrated) mounted on the vehicle VA.

(Outline of Operation)

The CAECU 20 specifies an object which exists in a traveling area of the vehicle VA based on the camera object information and the radar object information. Namely, an object located in an area between a predicted route of a right front end and a predicted route of a left front end of the vehicle VA (traveling area) is specified. The predicted route is presumed based on a current running direction of the vehicle VA.

When the number of the specified object is one, the CAECU 20 considers the specified object as an obstacle OB, and calculates TTC of the object. When a plurality of objects are specified, the CAECU 20 calculates TTC for each of the objects, and chooses, as an obstacle OB, an object which has the minimum TTC among those objects.

The CAECU 20 acquires (calculates) a lap rate Lp of the vehicle VA and the obstacle OB, which will be mentioned later. The lap rate Lp represents a lap degree in a vehicle width direction of the vehicle VA of the obstacle and the vehicle VA.

Next, the CAECU 20 judges whether the lap rate Lp is a threshold lap rate Lpth or more. The CAECU 20 starts automatic braking control, which will be mentioned later, when the TTC of the obstacle OB becomes a threshold time Tth or less in a case where the lap rate Lp is judged to be the threshold lap rate Lpth or more. The TTC of the obstacles OB being the threshold time Tth or less means satisfaction of an execution condition. The threshold time Tth is set such that the smaller the lap rate is, the shorter the threshold time Tth is (refer to FIG. 5). The threshold time Tth may be referred to as a "collision-avoidance threshold value." The automatic braking control is well-known control itself, in which a wheel is made to generate braking force in order to avoid a collision with the obstacle OB by stopping the vehicle VA just before the obstacle OB.

On the other hand, the CAECU 20 judges whether an avoidance area SP exists, when it is judged that the lap rate Lp is less than the threshold lap rate Lpth. The avoidance area SP is an area in which the vehicle VA can avoid a collision with the obstacle OB without traveling out of a self-lane SL (while keeping the whole vehicle VA in the self-lane SL) and passage of the vehicle VA is not blocked by a passage inhibition object PO that is the object other than the obstacle OB.

More specifically, the CAECU 20 judges that the avoidance area SP exists when both the following condition 1 and condition 2 are satisfied.

Condition 1: The vehicle VA can avoid obstacle OB without traveling out of the self-lane SL.

Condition 2: The vehicle VA can avoid obstacle OB without the passage of the vehicle VA being blocked by the passage inhibition object PO.

The CAECU 20 starts automatic steering control when the TTC of the obstacle becomes the threshold time Tth or less in a case where it is judged that the avoidance area SP exists. The automatic steering control is well-known control itself, in which a steering angle of the vehicle VA is automatically changed such that the vehicle VA travels along a route which passes the avoidance area SP and thereby avoids a collision with the obstacle OB without traveling out of the self-lane SL.

On the other hand, the CAECU 20 judges whether the passage inhibition object PO exists when it is judged that the avoidance area SP does not exists. The CAECU 20 acquires a virtual lap rate VLp by calculation when it is judged that the passage inhibition object PO exists (namely, when it is judged that the avoidance area SP does not exist due to a fact that the condition 2 is not satisfied). The virtual lap rate VLp is the lap rate Lp of the vehicle VA and a virtual obstacle that is a virtual object obtained by assuming the obstacle OB and the passage inhibition object as one object. Although processing for acquiring the virtual lap rate VLp will be mentioned later in detail, the virtual lap rate VLp becomes larger than the lap rate Lp of the obstacle. The distance and relative speed of the virtual obstacle with respective to the vehicle VA are the same as those of the obstacle OB, respectively.

The CAECU 20 judges whether the virtual lap rate VLp is the threshold lap rate Lpth or more. The CAECU 20 performs an automatic braking control, when a special condition that the virtual lap rate VLp is the threshold lap rate Lpth or more and the TTC of the obstacle OB is the threshold time Tth or less is satisfied. On the other hand, the CAECU 20 performs neither the automatic braking control nor the automatic steering control, when the above-mentioned special condition is not satisfied. Especially, when the virtual lap rate VLp is less than the threshold lap rate Lpth, there is a high possibility that a driver avoids a collision with the obstacle by operating a steering wheel. Since there is a high possibility that sense of incongruity may be given to the driver when the automatic braking control is performed in such a case, the CAECU 20 is configured not to perform the automatic braking control when the virtual lap rate VLp is less than the threshold lap rate Lpth.

As will be understood from the above, the present control apparatus 10 performs the automatic braking control, if a special condition (VLp≥LPth and TTC≥Tth) is satisfied, in a case where the avoidance area SP does not exist due to the existence of the passage inhibition object PO. Although the automatic steering control cannot be performed when the avoidance area SP does not exist due to the existence of the passage inhibition object PO, the automatic braking control is performed when the special condition is satisfied. Thereby, it is possible to provide a driver with suitable control to help the vehicle VA avoid a collision with the obstacle OB without giving sense of incongruity to the driver.

The TTC, the lap rate Lp, the avoidance area SP and the virtual lap rate VLp will be explained below.

<TTC>

The CAECU 20 acquires the TTC by dividing the distance to the object by the relative speed of the object.

<Lap Rate>

The CAECU 20 acquires the lap rate Lp using the following formula 1.

$$Lp=(L/W)\times 100 \qquad \text{Formula 1}$$

L: Length of a lap of the obstacle with the vehicle VA in the vehicle width direction Dy (refer to FIG. 2A and FIG. 2B)

W: Vehicle width of the vehicle VA

Figure 2A:
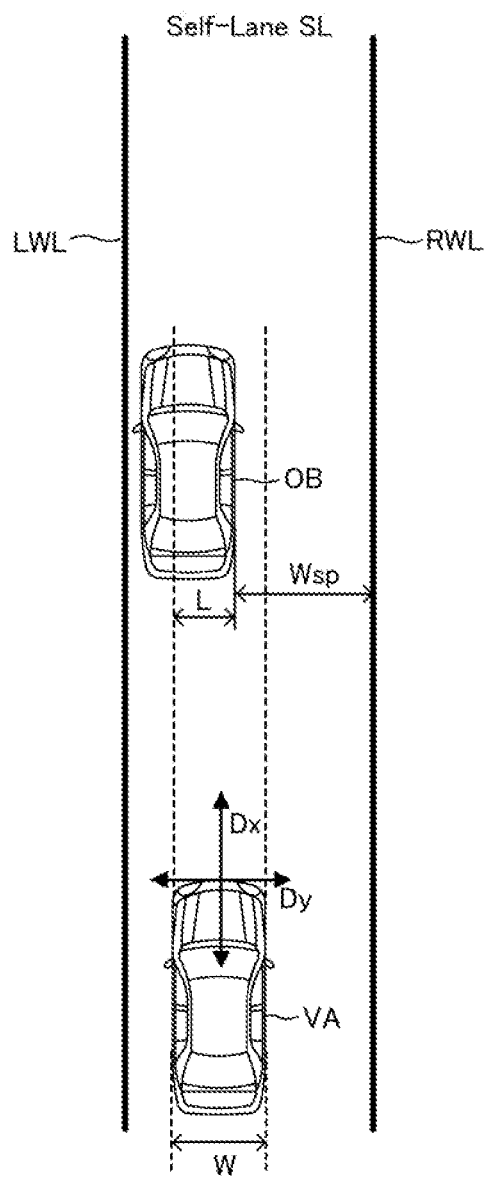
FIG. 2A is a diagram for explaining arithmetic processing of a lap rate.

In FIG. 2A and FIG. 28, the sign Dx shows a front-back direction of the vehicle VA, and the sign Dy shows the vehicle width direction that is a right-left direction of the vehicle VA.

<Avoidance Area SP>

The CAECU 20 judges whether the obstacle laps on the right or left side with respect to a central part of the front end of the vehicle VA. In the example shown in FIG. 2B, the obstacle OB (the pedestrian Pd shown in FIG. 2B) laps with the vehicle VA on the left side. In this case, the CAECU 20 tries to avoid a collision with the obstacle OB by changing a route of the vehicle VA to the right from its current position. Therefore, the CAECU 20 judges whether the avoidance area SP exists on the right side of the obstacle OB (namely, the CAECU 20 judges whether both the above-mentioned condition 1 and condition 2 are satisfied).

Judging Method of Condition 1

The CAECU 20 judges that the condition 1 is satisfied, when a distance Wsp between a right endpoint RP of the obstacle OB and the right white line RWL (which will be referred to as a "judgment distance Wsp" hereafter) is a value obtained by adding a predetermined margin D to a vehicle width W of the vehicle VA or more (namely, when the following formula 2 is fulfilled).

$$Wsp \geq W+D \qquad \text{Formula 2}$$

D: Predetermined Margin (D>0)

In addition, when the obstacle OB laps with the vehicle VA on the right side, the CAECU 20 acquires, as the judgment distance Wsp, a distance between a left endpoint of the obstacle OB and the left white line LWL.

Judging Method of Condition 2

When the CAECU 20 judges that the condition 1 is satisfied, the CAECU 20 judges whether an object exists in a predicted passage area PA that is an area where the vehicle VA is expected to pass through if the automatic steering control were performed. When an object exists in the predicted passage area PA, the CAECU 20 considers the object as the passage inhibition object PO. For this reason, the CAECU 20 judges that the condition 2 is satisfied, when the CAECU 20 judges that an object does not exist in the predicted passage area PA.

The predicted passage area PA will be explained below. The CAECU 20 sets, as the avoidance area SP, a rectangular space having a length Wsp in the vehicle width direction Dy from the right endpoint RP of the obstacle toward the right direction and having a length from the front end of the vehicle VA to a "point a predetermined length Lsp away from the closest point CP that is a point of the obstacle closest to the vehicle VA in a direction away from the vehicle VA in the front-back direction Dx" (refer to FIG. 2B and FIG. 3). The length Lsp may be set as a length of about the length of the vehicle VA in its front-to-back direction (vehicle length of the vehicle VA), and may be set as a length of about a double of the vehicle length.

Figure 2B:
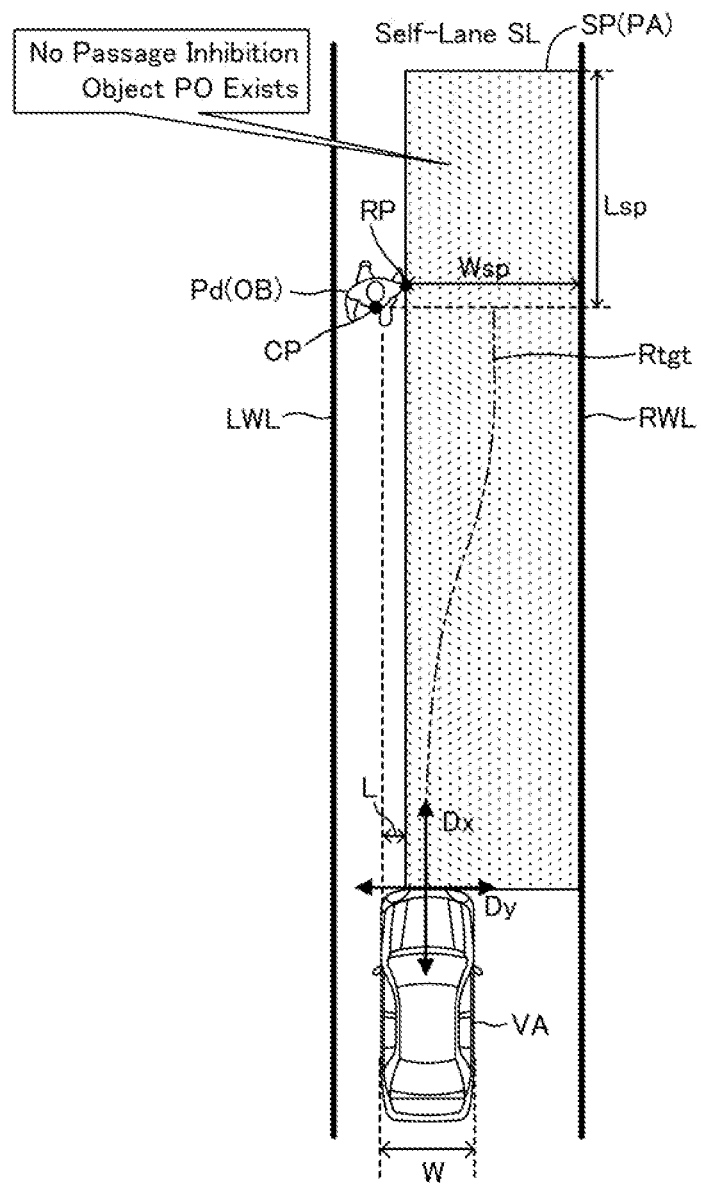
FIG. 2B is a diagram for explaining a situation of a self-lane in a case where other object does not exist in an avoidance area.

In the example shown in FIG. 2B, it is assumed that the judgment distance Wsp fulfills the above-mentioned formula 2 and the passage inhibition object PO does not exist. For this reason, in the example shown in FIG. 28, the CAECU 20 judges that the avoidance area SP exists, and performs the above-mentioned automatic steering control when the TTC of the obstacle becomes the threshold time Tth or less.

<Virtual Lap Rate VLp>

Processing for acquiring the virtual lap rate VLp will be explained below, referring to FIG. 3.

Figure 3:
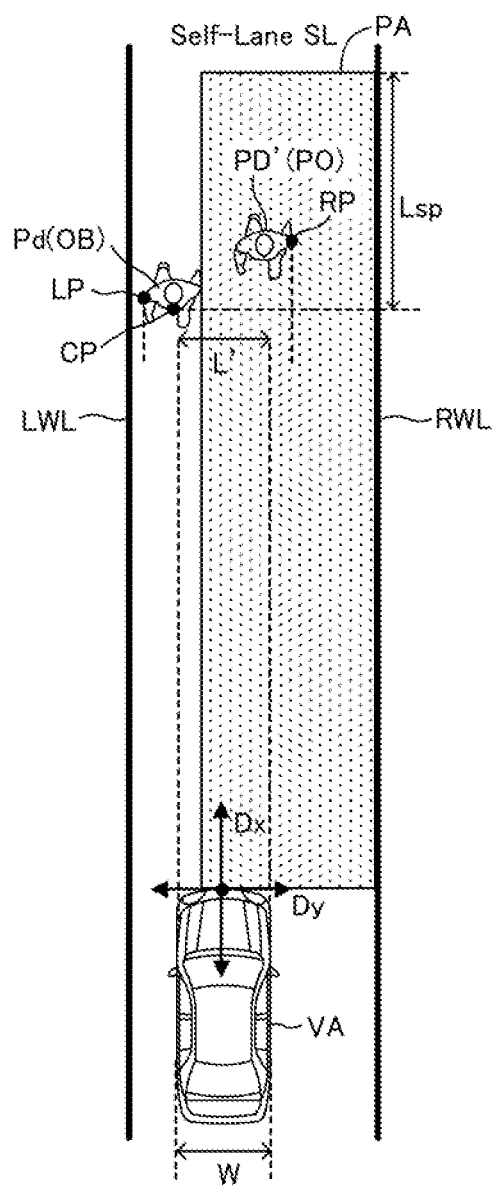
FIG. 3 is a diagram for explaining a situation of a self-lane in case where other object exists in an avoidance area.

In the example shown in FIG. 3, a pedestrian Pd' (passage inhibition object PO) exists in the predicted passage area PA. The CAECU 20 acquires a left endpoint LP located at the leftmost endpoint and a right endpoint RP located at the rightmost endpoint among the virtual obstacles including the obstacle OB (pedestrian Pd) and the passage inhibition object PO (pedestrian Pd'). In the example shown in FIG. 3, the left endpoint LP is acquired from the pedestrian Pd, and the right endpoint RP is acquired from the pedestrian Pd'. The CAECU 20 acquires, as the virtual lap ratio VLp, a value obtained by dividing a length L' by the vehicle width W. The length L' is a length of a lap of an area between the left endpoint LP and the right endpoint RP with the vehicle VA in the vehicle width direction Dy. In the example shown in FIG. 3, since the length L' coincides with the vehicle width W, the virtual lap rate VLp is "100%."

Since this virtual lap rate VLp is the threshold lap rate Lpth or more, the CAECU 20 judges that the above-mentioned special condition is satisfied and performs the automatic braking control, when the TTC of the obstacle is the threshold time Tth or less.

(Specific Operation)

<Collision-Avoidance Control Routine>

Figure 4:
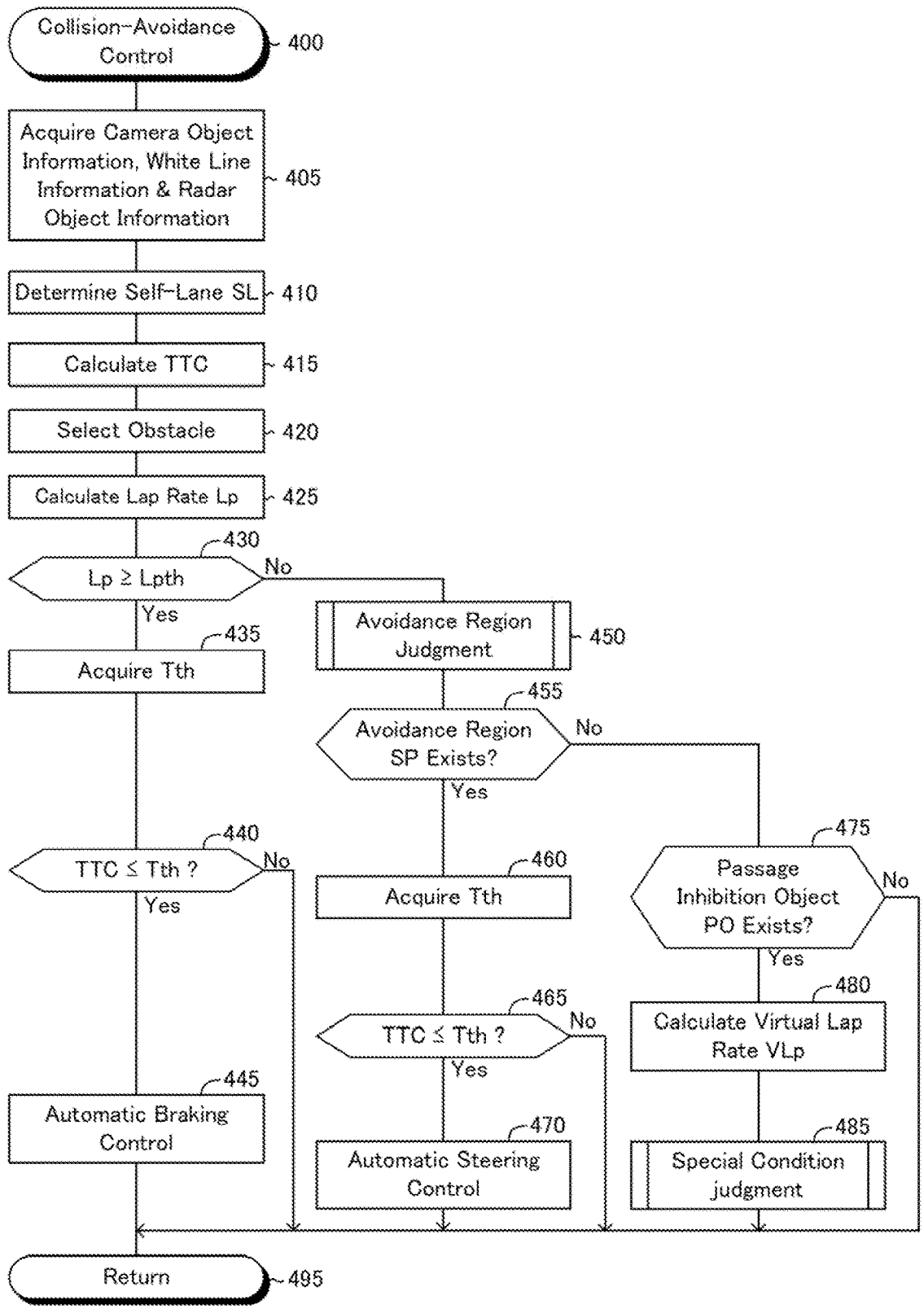
FIG. 4 is a flowchart for showing a collision-avoidance control routine which a CPU of a collision-avoidance ECU shown in FIG. 1 performs.

The CPU of the CAECU 20 ("CPU" will means the CPU of the CAECU 20 hereafter, unless otherwise noted) performs a collision-avoidance control routine shown in FIG. 4 every time a predetermined time elapses.

Therefore, at a predetermined timing, the CPU starts processing from step 400 in FIG. 4, performs processing of step 405 to step 425 in this order, and progresses to step 430.

Step 405: the CPU acquires the camera object information and the white line information from the camera device 24 and acquires the radar object information from the millimeter-wave radar device 26.

Step 410: the CPU specifies the left white line LWL and the right white line RWL based on the white line information, and specifies the area between the left white line LWL and the right white line RWL as the self-lane SL.

Step 415: the CPU specifies an object located in the traveling area of the vehicle VA based on the camera object information and the radar object information, and calculates the TTC of the specified object.

Step 420: the CPU chooses, as an obstacle, an object having the minimum TTC.

Step 425: the CPU calculates the lap rate Lp of the obstacle.

Step 430: the CPU judges whether the lap rate Lp is the threshold lap rate Lpth or more.

When the CPU judges that the lap rate Lp is the threshold lap rate Lpth or more, the CPU judged as "Yes" at step 430, and performs step 435 and step 440.

Figure 5:
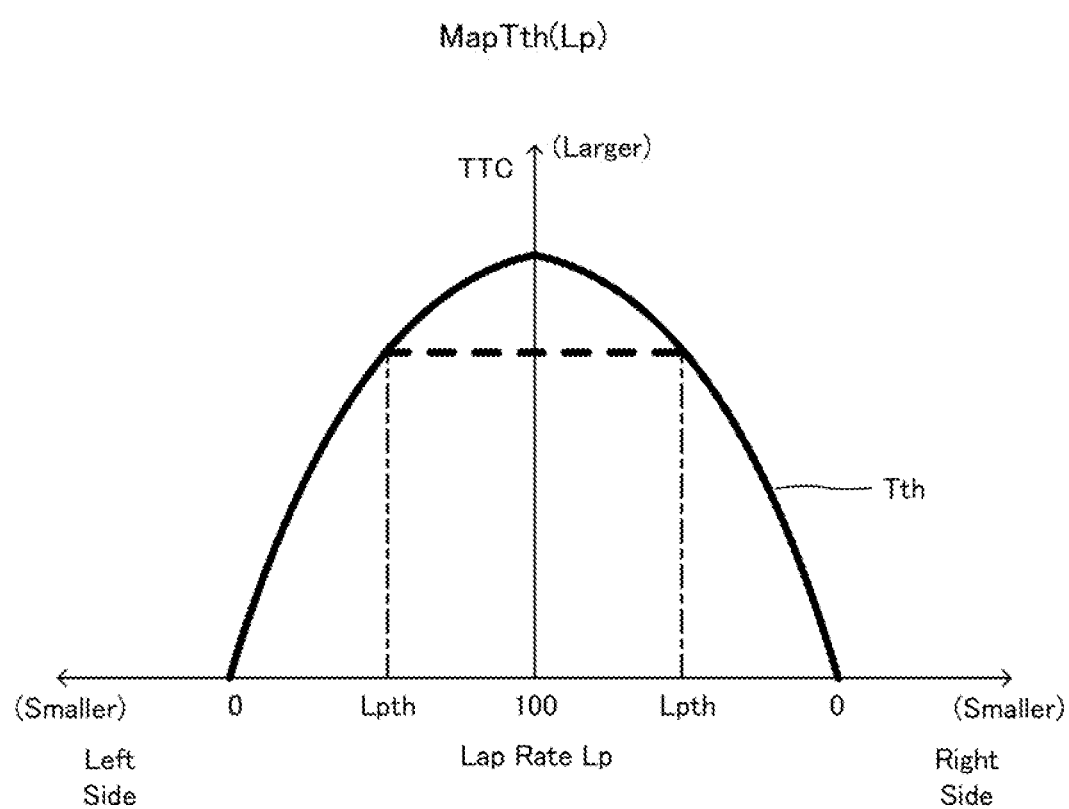
FIG. 5 is a diagram for explaining a threshold time map.

Step 435: the CPU acquires the threshold time Tth by applying the lap rate Lp to the threshold time map MapTth (Lp) shown in FIG. 5.

The threshold time map MapTth(Lp) is previously stored in the ROM of the CAECU 20. In the threshold time map MapTth(Lp) shown in FIG. 5, a vertical axis represents the TTC and a horizontal axis represents the lap rate Lp. The value of the vertical axis becomes smaller towards the bottom of the drawing. The value on the horizontal axis become smaller toward the outside from the center. The right part of the horizontal axis represents the lap rate Lp when the vehicle VA is located on the right side with respect to the obstacle, and the left part of the horizontal axis represents the lap rate Lp when the vehicle VA is located on the left side with respect to the obstacle.

In accordance with the threshold time map MapTth(Lp), the threshold time Tth is set so as to become smaller as the lap rate Lp decreases. Namely, the smaller the lap rate Lp is, the more difficult it is for a condition that the TTC is the threshold time Tth or less to be satisfied. The threshold time Tth related with the lap rate Lp which is the threshold lap rate Lpth or more is the threshold time Tth for the automatic braking control. The threshold time Tth related with the lap rate Lp which is less than the threshold lap rate Lpth is the threshold time Tth for the automatic steering control.

Step 440: the CPU judges whether the TTC of the obstacle is the threshold time Tth or less (namely, the CPU judges whether the execution condition is satisfied).

When the CPU judges that the TTC of the obstacle is larger than the threshold time Tth, the CPU judges as "No" at step 440, progresses to step 495, and once ends this routine.

On the other hand, when the CPU judges that the TTC of the obstacle is the threshold time Tth or less, the CPU judges as "Yes" at step 440, progresses to step 445 to perform the automatic braking control, and progresses to step 495 to once end this routine.

The automatic braking control will be explained below in detail. The CPU transmits requested acceleration Gbp, which is a predetermined negative value, to the engine ECU 40 and the brake ECU 50. A value of the requested acceleration Gbp is set to a value with which the vehicle VA can stop before collision with the obstacle or the maximum deceleration which the brake actuator 54 can generate.

The engine ECU 40 sets the target throttle valve opening TAtgt to "0 (minimum value)", when the requested acceleration Gbp is received. The brake ECU 50 adopts the lesser acceleration of the target acceleration based on the brake pedal operation amount BP and the above-mentioned requested acceleration Gbp, as final target acceleration. And, the brake ECU 50 controls the brake actuator 54 such that the acceleration in the front-back direction of the vehicle VA coincides with the above-mentioned final target acceleration.

On the other hand, in a case where the CPU progresses to step 430, when the CPU judges that the lap rate Lp is less than the threshold lap rate Lpth, the CPU judges as "No" at step 430, and perform step 450 and step 455 in this order.

Figure 6:
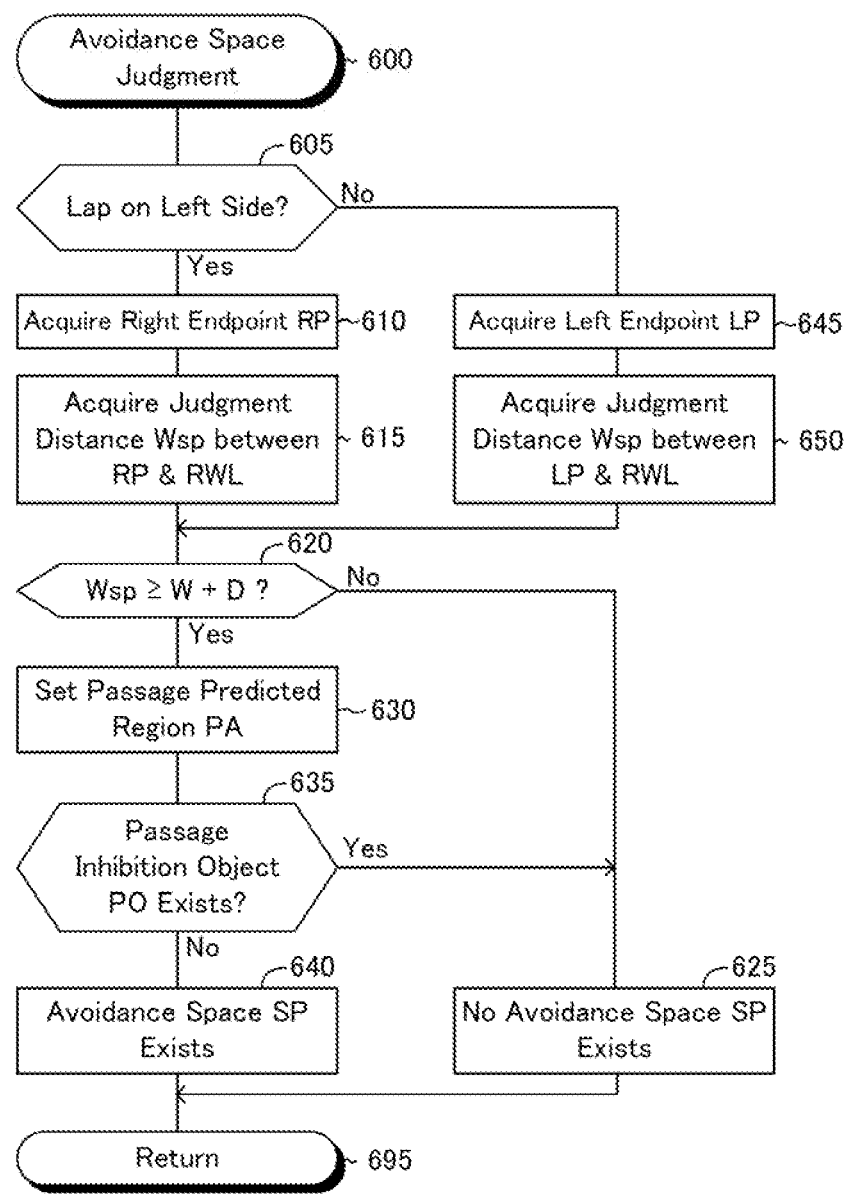
FIG. 6 is a flowchart for showing an avoidance area judgment routine which the CPU of the collision-avoidance ECU shown in FIG. 1 performs.

Step 450: the CPU performs an avoidance area judgment routine for judging whether the avoidance area SP exists (refer to FIG. 6).

Step 455: the CPU judges whether the avoidance area SP is judged to exist in the above-mentioned avoidance area judgment routine.

When the CPU judges that the avoidance area SP exists, the CPU judges as "Yes" at step 455, and performs step 460 and step 465 in this order.

Step 460: the CPU acquires the threshold time Tth by applying the lap rate Lp to the above-mentioned threshold time map MapTth(Lp).

Step 465: the CPU judges whether the TTC of the obstacle is the threshold time Tth or less (namely, the CPU judges whether the execution condition is satisfied).

When the CPU judges that the TTC of the obstacle is larger than the threshold time Tth, the CPU judges as "No" at step 465, and progresses to step 495, and once ends this routine. On the other hand, when the CPU judges that the TTC of the obstacle is the threshold time Tth or less, the CPU judges as "Yes" at step 465, progresses to step 470, and performs the automatic steering control. Thereafter, the CPU progresses to step 495, and once ends this routine.

The automatic steering control will be explained below in detail.

The CPU determines a target traveling route Rtgt that is a route through which the front end central part of the vehicle VA passes such that the vehicle VA avoids a collision with the obstacle OB without traveling out of the self-lane SL (namely, such that the vehicle VA travels through the avoidance area SP) (refer to FIG. 2B). Processing for determining the target traveling route Rtgt is described in Japanese Patent Application Laid-Open (kokai) No. 2017-43262.

Then, the CPU calculates a target steering angle θtgt according to the following formula 3 such that the vehicle VA travels with the front end central part of the vehicle VA along the target travel path Rtgt.

$$\theta tgt = K1 \times Cb + K2 \times \theta L + K3 \times dL \quad \text{Formula 3}$$

Cb: a curvature of the target traveling route Rtgt at a current position of the vehicle VA. Its sign is different depending on a turning direction of the vehicle VA (turning to the left or turning to the right).

θL: an angle deviation between the target traveling route Rtgt and the running direction of the vehicle VA.

dL: a distance in the vehicle width direction Dy between the front end central part of the vehicle VA and the target traveling route Rtgt.

K1, K2, K3: control gains (constants).

The CAECU 20 acquires the Cb, θL and dL based on the camera image acquired from the camera device 24.

Then, the CPU transmits the target steering angle θtgt to the steering ECU 60. The steering ECU 60 controls a steering angle by driving the steering motor 66 such that the steering angle θ coincides with the target steering angle θtgt. Thereby, the steering control is carried out such that the vehicle VA avoids the obstacle OB without traveling out of the self-lane SL.

On the other hand, when the CPU judges that the avoidance area SP does not exist when progressing to step 455, the CPU judges as "No" at step 455 and progresses to step 475. At step 475, the CPU judges whether the passage inhibition object PO is judged to exist in the above-mentioned avoidance area judgment routine.

When it is judged with the passage inhibition object PO does not exist in the avoidance area judgment routine, the above-mentioned condition 1 is not satisfied. In this case, the CPU judges as "No" at step 475, progresses to step 495, and once ends this routine. As a result, neither the automatic braking control nor the automatic steering control is performed.

On the other hand, when it is judged that the passage inhibition object PO exists in the avoidance area judgment routine, the CPU judges as "Yes" at step 475, performs step 480 and step 485 in this order, progresses to step 495, and once ends this routine.

Step 480: the CPU acquires the virtual lap rate VLp.

Figure 7:
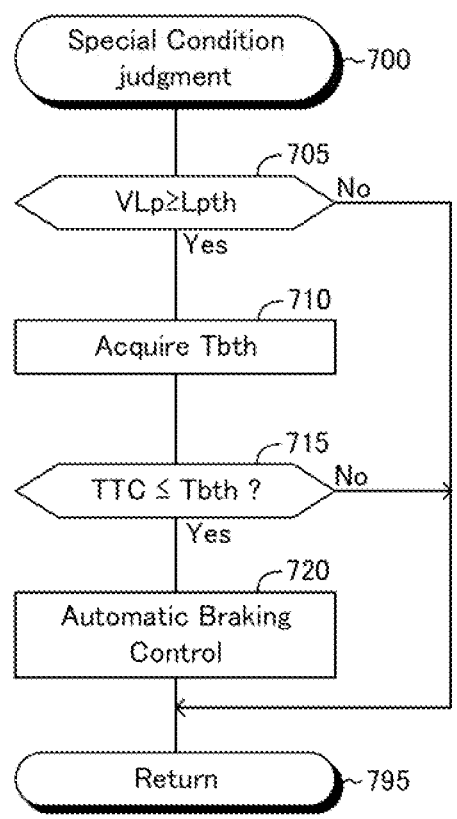
FIG. 7 is a flowchart for showing a braking control re-judgment routine which the CPU of the collision-avoidance ECU shown in FIG. 1 performs.

Step 485: the CPU performs a special condition judgment routine shown in FIG. 7.

<Avoidance Area Judgment Routine>

When progressing to step 4450 shown in FIG. 4, the CPU starts processing of the avoidance area judgment routine shown by a flowchart in FIG. 6 from step 600, and progresses to step 605.

Step 605: the CPU judges whether the obstacle laps with the vehicle VA on the left side of the vehicle VA.

When it is judged that the obstacle laps with the vehicle VA on the left side of the vehicle VA, the CPU judges as "Yes" at step 605, and performs step 610 to step 620 in this order.

Step 610: the CPU acquires the right endpoint RP of the obstacle.

Step 615: the CPU acquires the distance between the right endpoint RP and the right white line RWL as the judgment distance Wsp.

Step 620: the CPU judges whether the judgment distance Wsp is a "total value of the vehicle width W and the margin D" or more.

When the CPU judges that the judgment distance Wsp is less than the above-mentioned total value, the CPU judges that the above-mentioned condition 1 is not satisfied. In this case, the CPU judges as "No" at step 620, progresses to step 625 to judge that the avoidance area SP does not exist, and thereafter progresses to step 695 to once end this routine.

On the other hand, when the CPU judges that the judgment distance Wsp is the above-mentioned total value or more, the CPU judges that the above-mentioned condition 1 is satisfied. In this case, the CPU judges as "Yes" at step 620, and performs step 630 and step 635 in this order.

Step 630: the CPU sets the predicted passage area PA.

Step 635: the CPU judges whether the passage inhibition object PO exists in the predicted passage area PA.

When the CPU judges that the passage inhibition object PO exists, the CPU judges that the condition 1 is satisfied, but the condition 2 is not satisfied. In this case, the CPU is judges as "Yes" at step 635, progresses to step 625 to judge that the avoidance area SP does not exist, and thereafter progresses to step 695 to once end this routine.

On the other hand, when the CPU judges that the passage inhibition object PO does not exist, the CPU judges that both the condition 1 and the condition 2 are satisfied. In this case, the CPU judges as "No" at step 635, progresses to step 640 to judge that the avoidance area SP exists, and thereafter progresses to step 695 to once end this routine.

On the other hand, when the CPU judges that the obstacle laps with the vehicle VA on the right side of the vehicle VA at a time point when progressing to step 605, the CPU judges as "No" at that step 605, performs step 645 and step 650 in this order, and progresses to step 620.

Step 645: the CPU acquires the left endpoint LP of the obstacle.

Step 650: the CPU acquires a distance between the left endpoint LP and the left white line LWL as the judgment distance Wsp.

<Special Condition Judgment Routine>

When the CPU progresses to step 485 shown in FIG. 4, the CPU starts processing of the special condition judgment routine shown by a flowchart in FIG. 7 from step 700, and progresses to step 705.

Step 705: the CPU judges whether the virtual lap rate VLp is more than the threshold lap rate Lpth.

When the CPU judges that the virtual lap rate VLp is the threshold lap rate Lpth or more, the CPU judges as "Yes" at step 705, and performs step 710 and step 715 in this order.

Step 710: the CPU acquires the threshold time Tth by applying the virtual lap rate VLp to the threshold time map MapTth(Lp).

Step 715: the CPU judges whether the TTC of the obstacle is the threshold time Tth or less.

When the TTC of the obstacle is below the threshold time Tth, the CPU judges that the above-mentioned special condition is satisfied. In this case, the CPU judges as "Yes" at step 715, performs step 720, and thereafter progresses to step 795 to once end this routine.

Step 720: the CPU performs the above-mentioned automatic braking control.

On the other hand, when the TTC of the obstacle is larger than the threshold time Tth, the CPU judges that the above-mentioned special condition is not satisfied. In this case, the CPU judges as "No" at step 715, and progresses to step 795 to once end this routine.

On the other hand, when the CPU judges that the virtual lap rate VLp is less than the threshold lap rate Lpth at the time point when progressing to step 705, the CPU judges that the above-mentioned special condition is not satisfied. In this case, the CPU judges as "No" at that step 705, and progresses to step 795 to once end this routine.

As will be understood from the above, since the present control apparatus 10 performs the automatic braking control when the special condition is satisfied in a case where the avoidance area SP does not exist due to the existence of the passage inhibition object PO, the present control apparatus 10 can property performs control for the vehicle VA to avoid a collision with the obstacle OB without giving sense of incongruity to the driver.

(Modification)

In this modification, when the avoidance area SP does not exist due to the existence of the passage inhibition object PO, a predetermined value Vd larger than the threshold lap rate Lpth is acquired as the virtual lap rate VLp. Therefore, in a case where the avoidance area SP does not exist due to the existence of the passage inhibition object PO, when the special condition that the TTC of the obstacle is the threshold time Tth or less is satisfied, the automatic braking control is performed.

Figure 8:
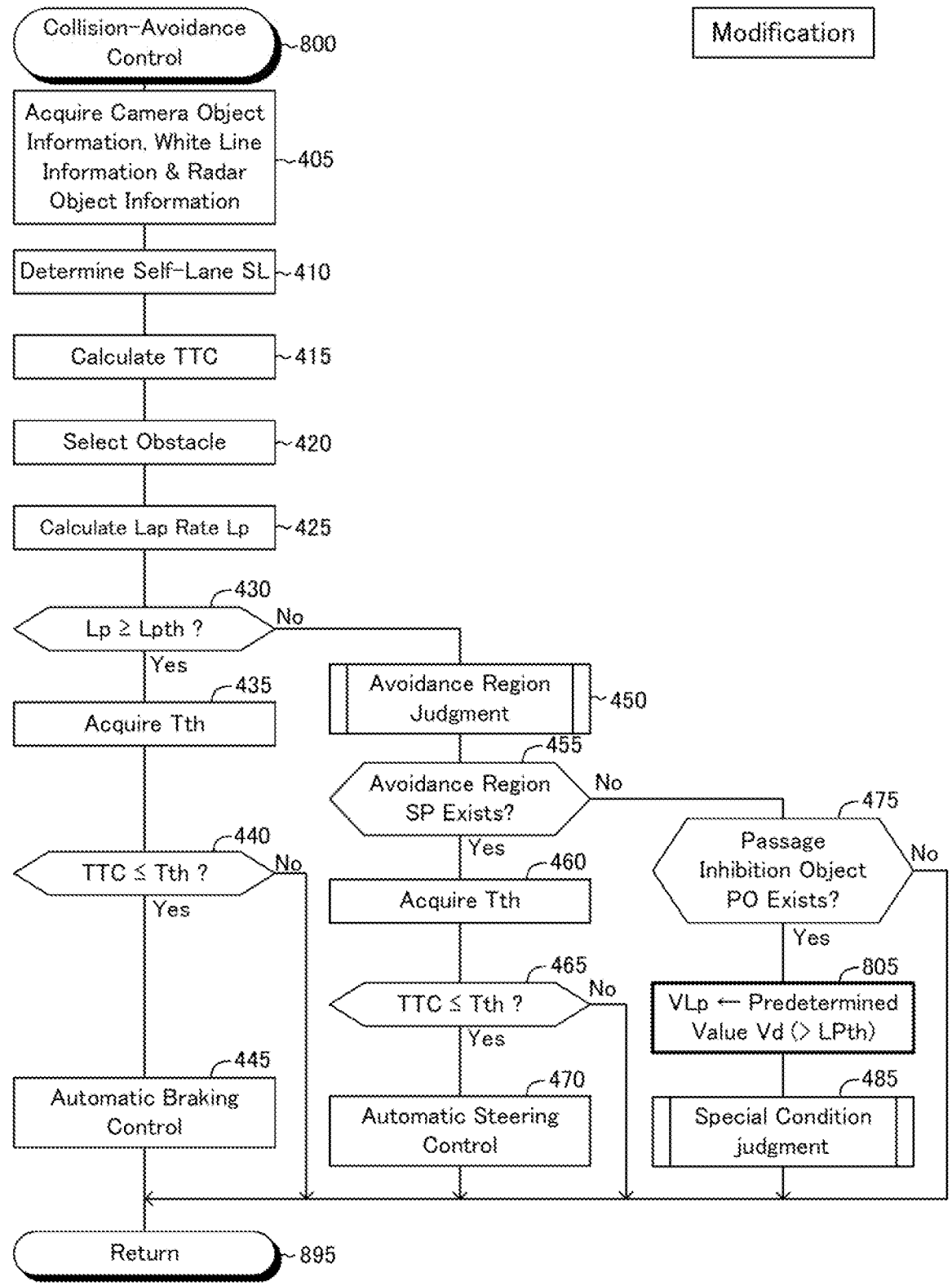
FIG. 8 is a flowchart for showing a collision-avoidance control routine which a CPU of a collision-avoidance ECU of the present control apparatus according to a first modification performs.

The CPU of CAECU 20 in this modification performs the collision-avoidance control routine shown in FIG. 8 instead of the collision-avoidance control routine shown in FIG. 4 every time a predetermined time elapses. In FIG. 8, the same reference signs as those used in FIG. 4 are given to steps in which the same processing as that in the steps shown in FIG. 4, and explanation about these steps is omitted.

The CPU starts processing from step 800 shown in FIG. 8 at a predetermined time point. The CPU judges as "No" respectively at step 430 and step 455 shown in FIG. 8, judges as "Yes" at step 475 shown in FIG. 8, and then progresses to step 805.

At step 805, the CPU sets the above-mentioned predetermined value Vd as the virtual lap rate VLp, performs step 495 shown in FIG. 8, and thereafter progresses to step 895 to once end this routine.

Therefore, in a case where the avoidance area SP does not exist due to the existence of the passage inhibition object PO ("Yes" at step 475 shown in FIG. 8), the virtual lap rate VLp is always the threshold lap rate Lpt or more. For this reason, in a case where the avoidance area SP does not exist due to the existence of the passage inhibition object PO, when the TTC of the obstacle is the threshold time Tth or less, the CPU judges that the special condition is satisfied, and performs the automatic braking control.

The present disclosure is not limited to the above-mentioned embodiments, and can adopt various modifications within the scope of the present disclosure.

The CAECU 20 may use distances L between the front end central part of the vehicle VA and respective objects instead of the TTC. These distances L and the TTC are the values representing the possibility of the collision of respective objects with the vehicle VA, and are referred to as a "collision index value."

The CAECU 20 may acquire the lap rate Lp using the following formula 4.

$$Lp=La/Wa\times100 \qquad \text{Formula 4}$$

La: length of a lap in which the obstacle laps with an "area between a right position that is a position a predetermined distance α separated rightward from the rightmost part of the vehicle VA and a left position that is a position the predetermined distance α separated leftward from the leftmost part of the vehicle VA" in the vehicle width direction Dy.

Wa: a distance between the above-mentioned right place and the above-mentioned left place (namely, Wa=W+2α).

Furthermore, in the routine shown in FIG. 4, the CPU may be configured to return to step 430 without performing step 485 after acquiring the virtual lap rate VLp at step 480. In this case, at step 430, the CPU judges whether the virtual lap rate VLp is the threshold lap rate Lpth or more.

In this case, the CPU judges as "No" at step 430 since the virtual lap rate VLp is less than the threshold lap rate Lpth, and proceeds the processing by assuming that the virtual obstacle is the obstacle, in the avoidance area judgment routine which is performed when progressing to step 450. In more detail, at step 605, the CPU judges whether the virtual obstacle laps with the vehicle VA on the left side of the vehicle VA. At step 610, the CPU acquires the right endpoint RP of the virtual obstacle. At step 635, the CPU acquires the left endpoint LP of the virtual obstacle.

Similarly, in the routine shown in FIG. 8, the CPU may be configured to return to step 430 shown in FIG. 8 without performing step 485 shown in FIG. 8 after acquiring the virtual lap rate VLp at step 805.

Furthermore, in the threshold time map MapTth(Lp) shown in FIG. 5, the threshold time Tth corresponding to the lap rate Lp which is more than the threshold lap rate Lpth may be a fixed value irrespective of the lap rate Lp (refer to the dotted line shown in FIG. 5).

The predicted passage area PA set up at step 630 shown in FIG. 6 may be an "area through which the vehicle VA passes when the vehicle VA travels the target traveling route Rtgt without colliding with the obstacle and traveling out of the self-lane SL."

The camera device 24 may be a stereoscopic camera device, and may be a monocular camera device. The millimeter-wave radar device 26 may be a remote-sensing device which can detect an object by transmitting a wireless medium other than a millimeter wave and receiving the reflected wireless medium. Furthermore, the present control apparatus 10 does not have to comprise the millimeter-wave radar device 26, as long as the present control apparatus 10 can correctly specify positions of objects with respect to the vehicle VA based on the camera object information. The present control apparatus 10 does not have to comprise the camera device 24, as long as the present control apparatus 10 can correctly specify positions of objects with respect to the vehicle VA based on the radar object information.

Furthermore, the present control apparatus 10 can be applied to electric vehicles and hybrid vehicles as well.

REFERENCE SIGNS LIST

10: Vehicle Control Apparatus, 20: Collision-Avoidance ECU (CAECU), 22: Wheel Speed Sensor, 24: Camera Device, 26: Millimeter-Wave Radar Device, 26: Acceleration Sensor, 40: Engine ECU, 42: Accelerator Pedal Operation-Amount Sensor, 44: Engine Sensor, 46: Engine Actuator, 50: Brake ECU, 52: Brake Pedal Operation-Amount Sensor, 54: Brake Actuator, 60: Steering ECU, 62: Steering Angle Sensor, 66: Steering Motor.

The invention claimed is:

1. A vehicle control apparatus comprising:
an information-acquisition device which acquires peripheral information including information about objects located around a vehicle and a self-lane on which said vehicle is traveling currently,
a braking actuator configured so as to be able to give braking force to said vehicle,
a steering actuator configured so as to be able to change a steering angle of said vehicle, and
a control unit which controls said braking actuator and said steering actuator;
wherein
said control unit is configured so as to,
acquire a collision index value indicating a possibility that said vehicle and the objects located in a traveling area of said vehicle may collide with each other based on said peripheral information, and to acquire a lap rate indicating, a lap degree in a vehicle width direction between said vehicle and an obstacle that is the object having the smallest collision index value based on said peripheral information,
perform automatic braking control in which said braking actuator is driven to give said braking force to said vehicle when an execution condition which is satisfied when the collision index value for said obstacle and a collision-avoidance threshold value fulfill a predetermined condition is satisfied, in a case where said lap rate is a predetermined threshold lap rate or more,
perform automatic steering control in which said steering angle is changed by said steering actuator such that said vehicle travels toward an avoidance area when said execution condition is satisfied, in a case where said lap rate is less than said predetermined threshold lap rate and furthermore said avoidance area in which said vehicle can avoid a collision with said obstacle without traveling out of said self-lane and passage of said vehicle is not blocked by a passage inhibition object that is the object other than said obstacle exists, and
perform said automatic braking control when a special condition including a condition that said execution condition is satisfied, if said passage inhibition object exists, in a case where said lap rate is less than said threshold lap rate and furthermore said avoidance area does not exist.

2. The vehicle control apparatus according to claim 1, wherein:
said control unit is configured so as to,
acquire a virtual lap rate indicating a lap degree in a vehicle width direction of said vehicle between said vehicle and a virtual obstacle obtained by assuming said obstacle and said passage inhibition object as one virtual object, if said passage inhibition object exists, in a case where said lap rate is less than said threshold lap rate and furthermore said avoidance area does not exist, and judge that said special condition is satisfied, in a case where said virtual lap rate is said threshold lap rate or more and said execution condition is satisfied.

3. The vehicle control apparatus according to claim 2, wherein:

said control unit is configured so as to, set said collision-avoidance threshold value as such a value that the smaller said lap rate becomes, the more difficult it becomes for said execution condition to be satisfied, in the judgment whether said execution condition is satisfied or not in any of a case where said lap rate is said threshold lap rate or more and a case where said lap rate is less than said threshold lap rate and furthermore said avoidance area exists, and set said collision-avoidance threshold value as such a value that the smaller said virtual lap rate becomes, the more difficult it becomes for said execution condition to be satisfied, in the judgment whether said execution condition is satisfied or not in a case where said lap rate is less than said threshold lap rate and furthermore said avoidance area does not exist and said passage inhibition object exists.

* * * * *